US006773815B2

(12) United States Patent
Amouroux

(10) Patent No.: US 6,773,815 B2
(45) Date of Patent: Aug. 10, 2004

(54) METAL SURFACES COATED WITH FLUORINATED POLYMERS

(75) Inventor: Nicolas Amouroux, Valailles (FR)

(73) Assignee: Atofina, Paris la Defense Cedex (FR)

( * ) Notice: Subject to any disclaimer, the term of this patent is extended or adjusted under 35 U.S.C. 154(b) by 0 days.

(21) Appl. No.: 10/088,560

(22) PCT Filed: Jul. 16, 2001

(86) PCT No.: PCT/FR01/02296

§ 371 (c)(1),
(2), (4) Date: Jul. 18, 2002

(87) PCT Pub. No.: WO02/06406

PCT Pub. Date: Jan. 24, 2002

(65) Prior Publication Data

US 2003/0087100 A1 May 8, 2003

(30) Foreign Application Priority Data

Jul. 19, 2000 (FR) ........................................... 00 09474

(51) Int. Cl.[7] ............................................... B32B 27/38
(52) U.S. Cl. ........................ 428/418; 428/421; 428/416
(58) Field of Search ................................ 428/421, 416, 428/418, 414; 137/1

(56) References Cited

U.S. PATENT DOCUMENTS

| | | | | | |
|---|---|---|---|---|---|
| 3,874,903 | A | * | 4/1975 | Wirth et al. | 428/416 |
| 4,720,405 | A | * | 1/1988 | Carson et al. | 427/410 |
| 6,080,487 | A | * | 6/2000 | Coggio et al. | 428/422 |
| 6,482,522 | B1 | * | 11/2002 | Parsonage et al. | 428/421 |
| 2002/0001721 | A1 | * | 1/2002 | Barriere et al. | 428/421 |

FOREIGN PATENT DOCUMENTS

| | | |
|---|---|---|
| FR | 2 793 801 | 11/2000 |
| WO | WO 9727260 | 7/1997 |

OTHER PUBLICATIONS

Patent Abstract of Japan vol. 1996, No. 03, Mar. 29 1996 of JP–07–308633 (Taiyo Seiko KK), Nov. 28, 1995.
Patent A bstract of Japan vol. 007, No. 053, (C–154), Mar. 3, 1983 of JP.57.20.1570 A (Mitsubishi Rayon KK), Dec. 10, 1982.

Patent Abstract of Japan, vol. No. 02, 1996, Dec. 26, 1996 of JP 08 196992 A (Randosukeepu:KK), Aug. 6, 1996.

Patent Abstract of Japan, vol. 016, No. 110 (C–0920), Mar. 18, 1992 of JP 03 284376 A (Yoshida Kogyo KK; Others: 01), Dec. 16, 1991.

* cited by examiner

*Primary Examiner*—David J. Buttner
*Assistant Examiner*—Christopher Keehan
(74) *Attorney, Agent, or Firm*—Millen, White, Zelano & Branigan, P.C.

(57) ABSTRACT

The present invention relates to a coated metal surface comprising, successively:

a layer (1) of epoxy primer placed next to the metal, a layer (2) of binder comprising 98 to 50 parts by weight of at least one fluoropolymer L3 per 2 to 50 parts, respectively, of at least one polymer chosen from acrylic polymers L1 and polymers L2 which are fluoropolymers chemically modified by a partial dehydrofluorination followed by an oxidation, a layer (3) of fluoropolymer.

According to a first variant, the coating does not comprise the layer (3). However, it is recommended that the layer (2) which becomes the outer layer should be thicker than in the structure of the main invention.

According to a second variant, the coating does not comprise the layer of primer (1), the layer of binder necessarily contains the polymer L2 and the surface is necessarily the outer surface of tubes.

According to a third variant, the coating does not comprise the layer (2) and the layer (1) comprises a mixture of epoxy primer and polymer L2.

The invention relates more particularly to the coating of the outer surface of tubes. These tubes are useful for the development of offshore hot oil wells, since it is necessary for the tubes which transport the hot oil to withstand corrosion by seawater.

23 Claims, No Drawings

METAL SURFACES COATED WITH FLUORINATED POLYMERS

FIELD OF THE INVENTION

The present invention relates to metal surfaces coated with fluoropolymers and more particularly to tubes whose outer surface is coated with fluoropolymers. These tubes are useful for the development of offshore hot oil wells, since it is necessary for the tubes which transport hot oil to withstand corrosion by seawater.

THE TECHNICAL PROBLEM

No steel tube coating which can be readily produced industrially and which can withstand high temperature under offshore conditions is known at the present time. For the development of offshore hot wells, one solution consists in cooling the oil with a heat exchanger before raising it to the surface. This technique is very expensive. Furthermore, the cooling may result in the formation of a cold plug. It is also possible to make use of special steels, but they are prohibitively expensive. A coating made of fluoropolymer, for example PVDF (common abbreviation for polyvinylidene fluoride), as disclosed in the invention makes it possible to convey hot fluids (150° C.) under offshore conditions, using ordinary steel tubes.

PRIOR ART

Patent DE 3 422 920 discloses outer coatings for steel tubes, comprising, successively, a layer of epoxy resin, a layer of grafted polypropylene and, finally, an outer layer of a mixture of polypropylene and of a polypropylene/polyethylene block copolymer. The glass transition temperature Tg of the epoxy resin is between 80° C. and 94° C. These coatings are suitable for hot water at 90° C.

U.S. Pat. No. Re 30 006 discloses outer coatings for steel tubes, comprising, successively, an epoxy resin and a polyethylene modifed by grafting or copolymerization with maleic anhydride. Nothing is stated regarding the Tg of the epoxy resin; however, the polyethylene does not make it possible to work above 80° C.

Patent EP-A-0 770 429 discloses a coated metal surface such as the outer surface of a tube, comprising, successively, a layer of epoxy resin placed next to the metal and having a glass transition temperature of greater than 120° C., a layer of binder based on polypropylene modified by grafting and a layer of thermoplastic polymer. The thermoplastic polymer is chosen from polyamides, polyamide alloys and polypropylene. These coatings do not offer any protection against corrosion by seawater to tubes transporting oil at 150° C.

Patent EP-A-404 752 discloses structures consisting, successively, of a substrate, a primer and a layer of PVDF. The primer is a mixture of an epoxy resin with either PMMA (common abbreviation for polymethyl methacrylate) or a copolymer of methyl methacrylate and of ethyl acrylate. Patent EP-A-0 354 822 discloses similar structures. This coating does not withstand corrosion by seawater when the tubes transport oil at 150° C.

Patent WO 97/27260 discloses structures consisting, successively, of a substrate, a primer and a layer of PVDF. The primer is a mixture of at least two of the following three polymers, namely (i) a PVDF homopolymer, (ii) a PVDF copolymer comprising at least 50 mol % of VF2 and (iii) an acrylic polymer containing carboxylic acid functions, such as, for example, copolymers of methyl methacrylate and of acrylic acid. The substrate may be the outer surface of a tube. Patent WO 97/49777 discloses similar structures. This coating does not withstand corrosion by seawater when the tubes transport oil at 150° C.

It has now been found that a coating comprising, respectively, a layer of epoxy resin, a layer of binder based on PVDF and on at least one polymer chosen from acrylic polymers and oxidized fluoropolymers and a layer of PVDF, the epoxy resin being on the side of the metal, protects the metal against corrosion by seawater even if the metal is at 150° C. Variants of this coating, which are detailed later, may also be used.

BRIEF DESCRIPTION OF THE INVENTION

The present invention relates to a coated metal surface comprising, successively:

- a layer (1) of epoxy primer placed next to the metal,
- a layer (2) of binder comprising 98 to 50 parts by weight of at least one fluoropolymer L3 per 2 to 50 parts, respectively, of at least one polymer chosen from acrylic polymers L1 and polymers L2 which are fluoropolymers chemically modified by a partial dehydrofluorination followed by an oxidation,
- a layer (3) of fluoropolymer.

The present invention also relates to a process for manufacturing these coated surfaces. The metal surface is first degreased, sanded and then heated. The epoxy primer of the layer (1) is deposited in liquid form or by spraying or electrostatic spraying if it is a powder onto the metal surface heated to 200–240° C. After about 20 to 30 seconds, i.e. slightly before the end of the gel time and before the resin has crosslinked, in order for there to remain epoxide functions to react with the binder, the binder of the layer (2) is deposited either by spraying if it is in powder form, or by coating or rolling. Next, the fluoropolymer of the layer (3) is deposited in the same way. As regards the outer surface of metal tubes, the process is performed in the same way for the epoxy primer, and the binder is then either deposited by spraying if it is available in powder form, or extruded through a circular die (also known as a crosshead) arranged concentrically around the tube. The binder may also be extruded through a flat die producing a continuous strip which is wound around the tube, for example by means of rotating the tube on itself. The fluoropolymer is deposited in the same way.

The coating of the invention can readily be produced on a conventional coating line, due to the excellent processability of PVDF. The coating can be applied continuously, at a speed of at least 50 cm/minute, at a temperature of less than 250° C., this temperature making it possible to conserve all the initial properties of the steel. The ease of use is an advantage over other known solutions thermostable polymers such as polysulfone, polyphenylene ether or polyether imide which require either high temperatures or a long and intricate implementation with reactive solvents (post-curing).

According to a first variant, the coating does not comprise the layer (3). However, it is recommended that the layer (2) which becomes the outer layer should be thicker than in the structure of the main invention.

According to a second variant, the coating does not comprise the layer of primer (1), the layer of binder necessarily contains the polymer L2 and the surface is necessarily the outer surface of tubes.

That is to say that in this second variant, the invention relates to a coated metal surface which is the outer surface of tubes, comprising, successively:

a layer (2) of binder placed next to the metal and comprising 98 to 50 parts by weight of at least one fluoropolymer L3 per 2 to 50 parts, respectively, of a mixture comprising at least one polymer chosen from polymers L2 which are fluoropolymers chemically modified by a partial dehydrofluorination followed by an oxidation, and optionally at least one polymer chosen from acrylic polymers L1, a layer (3) of fluoropolymer.

According to a third variant, the coating does not comprise the layer (2) and the layer (1) comprises a mixture of epoxy primer and of polymer L2.

That is to say that in this third variant, the invention relates to a coated metal surface comprising, successively:

a layer (1) of primer placed next to the metal and comprising 1 to 70 parts of a polymer chosen from polymers L2 which are fluoropolymers chemically modified by a partial dehydrofluorination followed by an oxidation, per 30 to 99 parts, respectively, of an epoxy primer, a layer (3) of fluoropolymer.

The coating obtained has good impact strength, flexibility allowing slight bending of the tube and excellent adhesion to the metal, even at high temperature (up to 150° C.). These good properties are maintained on contact with seawater.

DETAILED DESCRIPTION OF THE INVENTION

The term "epoxy primer" used for the layer (1) advantageously denotes the product of the reaction of a thermosetting epoxy resin and of a hardener. Their principle is disclosed, for example, in Kirk-Othmer Encyclopaedia of Chemical Technology Vol. 9—pages 267–289, $3^{rd}$ edition. This layer (1) may also be defined as any product of the reaction of an oligomer bearing oxirane functions and of a hardener. As a result of the reactions carried out during the reaction of these epoxy resins, a crosslinked material is obtained corresponding to a three-dimensional network which is more or less dense depending on the base characteristics of the resins and hardeners used.

The term "epoxy resin" means any organic compound containing at least two functions of oxirane type, which can be polymerized by ring-opening. The term "epoxy resin" denotes any common epoxy resin which is liquid at room temperature (23° C.) or at higher temperature. These epoxy resins may be monomeric or polymeric, on the one hand, and aliphatic, cycloaliphatic, heterocylic or aromatic, on the other hand. Examples of such epoxy resins which may be mentioned include resorcinyl diglycidyl ether, bisphenol A diglycidyl ether, triglycidyl p-aminophenol, bromobisphenol F diglycidyl ether, m-aminophenyl triglycidyl ether, tetraglycidylmethylenedianiline, (trihydroxyphenyl) methane triglycidyl ether, polyglycidyl ethers of novolac phenol-formaldenhyde, polyglycidyl ethers of novolac ortho-cresol and tetraglycidyl ethers of tetraphenylethane. Mixtures of at least two of these resins may also be used.

The preferred resins are epoxy resins containing at least 1.5 oxirane functions per molecule and more particularly epoxy resins containing between 2 and 4 oxirane functions per molecule. Epoxy resins containing at least one aromatic ring, such as bisphenol A diglycidyl ethers, are also preferred.

As regards the hardener, the hardeners generally used are epoxy-resin hardeners which react at room temperature or at temperatures above room temperature. Non-limiting examples which may be mentioned include:

Acid anhydrides, including succinic anhydride,

Aromatic or aliphatic polyamines, including diaminodiphenyl sulphone (DDS) or methylenedianiline or 4,4'-methylenebis(3-chloro-2,6-diethylaniline) (MCDEA), Dicyandiamide and its derivatives, Imidazoles, Polycarboxylic acids, Polyphenols.

The resins used in the present invention are crosslinkable between 180° C. and 250° C.

The gel time is defined by AFNOR standard NFA 49-706. This is the time required to bring about a rapid increase in viscosity at a given temperature. The gel time is advantageously between 20 and 60 seconds.

The Tg is advantageously greater than 120° C. These resins may be in the form of powder or liquid which is sprayed onto the metal surface, which has been degreased, sanded and heated beforehand.

These are advantageously one-component powder resins which are conventionally obtained as follows:

The epoxy resin (solid at room temperature, e.g.: high mass DGEBA), the hardener, optionally the accelerators, the fillers, etc. are mixed together in the molten state; during this step, pre-crosslinking takes place but without going as far as the gel point, The mixture is cooled at the mixer outlet, so as to stop the crosslinking, The homogeneous solid obtained is made into powder.

A one-component powder is thus obtained which can be applied by the usual processes and which completes its crosslinking on contact with hot metal. Generally, for these applications, the preferred systems are those which crosslink only at high temperature, (180–240° C.) such that there is no problem of storage at room temperature (shelf life or pot life of 6 months-1 year).

These resins may comprise additives such as silicones, pigments such as titanium dioxide, iron oxides, carbon black, fillers such as calcium carbonate, talc or mica.

As regards the acrylic polymer (L1) of the layer (2), it consists essentially of alkyl (meth)acrylate units. The other monomers constituting (L1) may be acrylic or non-acrylic monomers, which may be reactive or unreactive. The term "reactive monomer" means: a chemical group capable of reacting with the oxirane functions of epoxy molecules or with the chemical groups of the hardener. Non-limiting examples of reactive functions which may be mentioned include: oxirane functions, amine functions, carboxyl functions, acid chloride functions and alcohol functions. The reactive monomer may be (meth)acrylic acid or any other hydrolyzable monomer leading to these acids. Among the other monomers which may constitute (L1), non-limiting examples which may be mentioned include glycidyl methacrylate and tert-butyl methacrylate. Examples of polymer (L1) which may be mentioned include homopolymers of an alkyl (meth)acrylate. Alkyl (meth)acrylates are described in Kirk-Othmer, Encyclopaedia of chemical technology, $4^{th}$ edition, in Vol. 1, pages 292–293 and in Vol. 16, pages 475–478. Mention may also be made of copolymers of at least two of these (meth)acrylates and copolymers of at least one (meth)acrylate with at least one monomer chosen from acrylonitrile, butadiene, styrene and isoprene, provided that the proportion of (meth)acrylate is at least 50 mol %. (L1) is advantageously PMMA with a few percent by weight of acid function. These polymers (L1) either consist of the monomers and optionally of the comonomers mentioned above and do not contain any impact modifier, or they also contain an acrylic impact modifier. The acrylic impact modifiers are, for example, random or block copolymers of at least one monomer chosen from styrene, butadiene and isoprene and of at least one monomer chosen from acrylonitrile and alkyl (meth)acrylates, and they may be of core-shell type. The impact modifiers may also be triblock copolymers consisting of a polystyrene block, a polybutadiene block and a PMMA block. These triblock copolymers are disclosed in patent application WO 99/29772. These acrylic impact modifiers may be mixed with the polymer (L1) once prepared or may be introduced during the polymerization of (L1) or prepared simultaneously during the polymerization of (L1). The amount of acrylic impact modifier may be, for example, from 0 to 30 parts per 100 to 70 parts of (L1) and advantageously from 5 to 20 parts per 95 to 20 parts of (L1). It would not constitute a departure from the context of the invention if (L1) was a blend of two or more of the above polymers.

The Tg of (L1) is advantageously greater than or equal to 120° C. and preferably greater than or equal to 130° C.

The MFI (melt flow index) of (L1) may be between 2 and 15 g/10 min measured at 230° C. under a 3.8 kg load.

The MVFR (melt volume flow rate) of (L1) may be between 1.5 and 12 $cm^3$/10 min measured at 230° C. under a 3.8 kg load. Polymers that are suitable for (L1) are Sumipex TR® from Sumitomo® and Oroglas HT121® from Atoglas. These are copolymers of methyl methacrylate and of (meth)acrylic acid.

As regards the fluoropolymer L2 of the layer (2), it is obtained from a fluoropolymer which is chemically modified by a partial dehydrofluorination followed by an oxidation. The fluoropolymer which is modified may be a fluoroplastic or a fluoroelastomer, provided that they contain units of general formula (I):

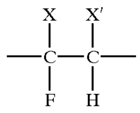

(I)

in which X and X' may be, independently of each other, a hydrogen atom, a halogen, in particular fluorine or chlorine, or a perhaloalkyl, in particular perfluoroalkyl.

The fluoropolymers which may be used may be prepared by polymerization or copolymerization of olefinic unsaturated monomers. To obtain a fluoropolymer having the unit of formula (I), the monomer and/or the comonomers must comprise both fluorine atoms linked to carbon atoms and hydrogen atoms linked to carbon atoms. For example, the fluoropolymers which may be used may be homopolymers prepared from hydrofluorocarbon monomers, or may be copolymers derived from perfluoro unsaturated monomers copolymerized with one or more unsaturated monomers containing hydrogen —H, namely a hydrofluorocarbon monomer and/or a non-fluoro monomer.

As examples of olefinic unsaturated monomers which may be used, mention may be made of hexafluoropropylene (HFP), tetrafluoroethylene (TFE), vinylidene fluoride ($VF_2$), chlorotrifluoroethylene (CTFE), 2-chloropentafluoropropene, perfluoroalkyl vinyl ethers such as $CF_3—O—CF{=}CF_2$ or $CF_3—CF_2—O—CF{=}CF_2$, 1-hydropentafluoropropene, 2-hydropentafluoropropene, dichloro-difluoroethylene, trifluoroethylene, 1,1-dichlorofluoroethylene and perfluoro-1,3-dioxoles such as those disclosed in U.S. Pat. No. 4,558,142, and olefinic unsaturated monomers comprising no fluorine, such as ethylene, propylene, butylene and higher homologues.

Diolefins containing fluorine may be used, for example diolefins such as perfluorodiallyl ether and perfluoro-1,3-butadiene.

The olefinic unsaturated monomers or comonomers may be polymerized to obtain a fluoropolymer by the processes known in the prior art of fluoropolymers.

In particular, as regards the processes for synthesizing poly(vinylidene fluoride) (PVDF), patents U.S. Pat. No. 3,553,185 and EP-A-0 120 524 disclose processes for synthesizing PVDF by placing vinylidene fluoride ($VF_2$) in aqueous suspension and polymerizing it. Patents U.S. Pat. No. 4,025,709, U.S. Pat. No. 4,569,978, U.S. Pat. No. 4,360,652, and EP-A-0 655 468 disclose processes for synthesizing PVDF by placing $VF_2$ in aqueous emulsion and polymerizing it.

In general, the olefinic unsaturated fluoro monomers may be polymerized and optionally copolymerized with non-fluoro olefinic monomers in aqueous emulsions. The emulsions contain, for example, a water-soluble initiator such as an ammonium or alkali metal persulfate or alternatively an alkali metal permanganate, which produce free radicals, and also contain one or more emulsifiers such as ammonium or alkali metal salts of a perfluorooctanoic acid.

Other aqueous colloidal suspension processes use initiators that are essentially soluble in the organic phase, such as dialkyl peroxides, alkyl hydroperoxides, dialkyl peroxydicarbonates or azoperoxides, the initiator being associated with colloids such as methylcelluloses, methylhydroxypropylcelluloses, methylpropylcelluloses and methylhydroxyethylcelluloses.

Many fluoropolymers and copolymers are commercially available, in particular those from the company Elf Atochem S.A. under the brand name Kynar®.

The fluoropolymer which is modified to convert it into L2 is preferably in the form of an aqueous dispersion, such as an emulsion or a suspension. This dispersion may be the product resulting from one of the synthetic methods recalled above.

The polymer which is modified to convert it into L2 is preferably PVDF homopolymer or a VF2-HFP copolymer.

This fluoropolymer is subjected to a partial dehydrofluorination with a base and the fluoropolymer thus partially dehydrofluorinated is then reacted with an oxidizing agent to give a new fluoropolymer L2.

This dehydrofluorination of the fluoropolymer is obtained by a base in aqueous medium or in an organic solvent. Bases which may be used are cited in WO 98/08880. They may be, for example, a hydroxide such as potassium hydroxide (KOH), ammonium hydroxide ($NH_4OH$), sodium hydroxide (NaOH), lithium hydroxide (LiOH), a carbonate such as potassium carbonate ($K_2CO_3$) or sodium carbonate ($Na_2CO_3$), a tertiary amine, a tetraalkylammonium hydroxide or a metal alkoxide. A process for the dehydrofluorination in aqueous medium of a fluoropolymer emulsion is also disclosed in patent application WO 98/08879. The base may be used with or without catalyst. The base may also be an amine derivative of hydrocarbon-based structure which is soluble or partially soluble in water or organic solvents, in particular 1,8-diazabicyclo[5.4.0]undec-7-ene (DBU) or 1,4-diazabicyclo[2.2.2]octane (DABCO).

The catalyst may be, for example, tetrabutylammonium bromide (TBAB) and tetraalkylphosphonium, alkylarylphosphonium, alkylammonium and alkylphosphonium halides. The basic compound and the optional catalyst may be dissolved or diluted in a solvent such as naphthalene, tetrahydrofuran (THF) and water.

The oxidation is preferably obtained in heterogeneous aqueous medium with hydrogen peroxide ($H_2O_2$) or with the hypochlorite anion ($ClO^-$) following the introduction of a hypochlorous acid salt (ClOM1) in which the cation (M1) corresponds, for example, to an alkali metal such as sodium or potassium. Specifically, hydrogen peroxide in aqueous phase makes it possible to have an advantageous process by minimizing the waste compared with a process using an organic solvent. Hydrogen peroxide in aqueous phase also allows a simplified treatment of the effluents compared with other oxidizing agents. Hypochlorous acid salts show the same advantages as hydrogen peroxide on account of their possibility of use in aqueous phase, and have a particular advantage in process terms since they can be introduced, partially or totally, from the first dehydrofluorination step.

The treatment with hydrogen peroxide may be activated in the presence of a metal catalyst, such as iron (II), which is introduced, for example, in the form of halides. According to the same principle, the treatment with the hypochlorous acid salt may be performed in the presence of a metal catalyst, such as manganese (III) or nickel (II) combined with various ligands such as alkylated polyamines, phthalocyanins or porphyrins. The reaction with the hypochlorite anion can also be promoted by adding an aprotic solvent, such as acetonitrile or glymes.

However, other oxidizing agents that are active in aqueous medium may be used, for example palladium or chromium halides, in particular $PdCl_2$ and $CrCl_2$, alkali metal permanganates, for example $KMnO_4$, peracid compounds, alkyl peroxides or persulfates, optionally combined with $H_2O_2$ or with activating co-reagents, such as sodium metabisulphite or potassium metabisulphite.

The reaction or the contact with aqueous $H_2O_2$ is advantageously performed at a pH ranging from 6.5 to 8 and preferably from 6.7 to 7.6. The reason for this is that for a pH of less than 6.5, the reaction is very slow, and for a pH of greater than 8, there is a risk of the $H_2O_2$ decomposition reaction running out of control.

The reaction or the contact with $H_2O_2$ is advantageously performed at a temperature ranging from 20° C. to 100° C. and better still from 50° C. to 90° C.

The total amount of $H_2O_2$ added, calculated on the basis of the pure peroxide, is advantageously from 1% to 50% by weight relative to the total weight of the reaction medium. This amount preferably ranges from 2% to 12%.

The reaction or the contact with the hypochlorite anion is advantageously performed at a pH ranging from 6 to 14.

The reaction or the contact with the hypochlorite anion is advantageously performed at a temperature ranging from 20 to 100° C. or better still from 50 to 90° C.

The total amount of hypochlorite anion added, calculated on the basis of sodium hypochlorite (NaClO), is advantageously from 0.1% to 50% by weight relative to the total weight of the reaction medium. This amount preferably ranges from 0.5% to 10%.

According to the process of the present invention, the modified polymers L2 have adhesion properties that are greatly increased compared with fluoropolymers that are not chemically modified.

The MFI (melt flow index) of L2 is advantageously between 0.2 and 5 g/10 min (at 230° C. under a 10 kg load) for L2 derived from the PVDF homopolymer and between 2 and 10 g/10 min (at 230° C. under a 5 kg load) for L2 derived from the copolymer of VF2 and of HFP.

As regards the fluoropolymer L3 of the layer (2), it may be chosen from polymers and copolymers containing units of general formula (I) cited above for the polymers treated to produce L2.

Examples of fluoropolymers L3 which will be cited most particularly are

- PVDFs, vinylidene fluoride (VF2) homopolymers and copolymers of vinylidene fluoride (VF2) preferably containing at least 50% by weight of VF2 and at least one other fluoromonomer such as chlorotrifluoroethylene (CTFE), hexafluoropropylene (HFP), trifluoroethylene (VF3) or tetrafluoroethylene (TFE),
- trifluoroethylene (VF3) homopolymers and copolymers,
- copolymers, and in particular terpolymers, combining the residues of chlorotrifluoroethylene (CTFE), tetrafluoroethylene (TFE), hexafluoropropylene (HFP) and/or ethylene units and optionally VF2 and/or VF3 units.

Among these fluoropolymers L3 that are advantageously used are PVDF homopolymer and VF2-HFP copolymers.

The melting point of L3 is advantageously greater than 150° C. A melting point which is as high as possible is preferred.

The MVFR (melt volume flow ratio) of L3 is advantageously between 2 and 25 $cm^3$/10 min and preferably between 4 and 10 $cm^3$/10 min (at 230° C. under a 5 kg load).

The proportion of L3 is advantageously from 95 to 70 parts by weight per 5 to 30 parts, respectively, of at least one polymer chosen from acrylic polymers L1 and the polymers L2.

The binder of this layer (2) can contain additives and fillers usually used in fluoropolymers.

A catalyst capable of increasing the reactivity of the reactive functions of L1 or L2 with the epoxy may be added. This catalyst may be 1,4-diazabicyclo[2.2.2]octane (DABCO) or methyl-2-imidazole (M2ID). These catalysts are disclosed in French patent FR-A-2 745 733.

A blend of L1 and L2 may also be used, i.e. the binder comprises 98 to 50 parts of L3 per 2 to 50 parts, respectively, of a blend of L1 and L2.

The proportion of L3 is advantageously from 95 to 70 parts by weight per 5 to 30 parts, respectively, of a blend of L1 and L2.

The binder may be manufactured by mixing together, in molten form, the various constituents in the usual devices for blending thermoplastic materials, and then used immediately or recovered after cooling in the form of powder or granules. It may also be manufactured by dry-blending of the various constituents in the form of powder or granules.

As regards the fluoropolymer of the layer (3), it may be chosen from the family of fluoropolymers described for L3. It is advantageously a PVDF homopolymer or a VF2-HFP copolymer having a melting point of at least 165° C. The MVFR is advantageously between 0.5 and 5 $cm^3$/10 min (at 230° C. under a 5 kg load).

The fluoropolymer of this layer (3) may contain additives and fillers usually used in fluoropolymers.

A common PVDF plasticizer, a dye or an acrylic impact modifier or triblock copolymer which may be chosen from the impact modifiers of L1 described above may also be added. The proportion of impact modifier in this layer (3) may be from 5 to 15 parts by weight per 95 to 85 parts, respectively, of fluoropolymer.

The thicknesses of the various layers may be from 50 to 150 $\mu$m for the layer (1), from 100 to 500 $\mu$m for the layer (2) and from 1000 to 5000 $\mu$m for the layer (3). The thicknesses are preferably, in $\mu$m, starting with the layer (1): 80/250/1500.

The metal surface may be of any type; however, the invention is particularly useful for the outer surface of tubes, these tubes possibly having an outside diameter, for example, of up to 0.8 or 1.5 m and a thickness of from 2 to 25 mm.

As regards the coating of tubes, the preferred process breaks down as follows:

- preparation of the steel tube: degreasing, shot-blasting and optionally surface treatment (chromatation, etc.);
- treatment of the tube in an infrared oven so as to reach a temperature of between 180 and 220° C.;
- application of the epoxy primer powder by electrostatic spraying (or other process in the case of a liquid epoxy resin);
- application of the binder by lateral extrusion, with bearing from a roll press. The time separating the application of the epoxy resin and the application of the binder must be less than the gel time of the epoxy;
- application of the outer layer made of fluoropolymer by lateral extrusion, bearing from a roll press;
- cooling with water.

The binder and the outer layer may also be extruded using a "crosshead" surrounding the tube. The binder and optionally the outer layer may also be applied by a powder process.

Besides the degreasing and shot-blasting, the steel may be chromated or silanized to improve the attachment of the primer.

As regards the first variant, the thicknesses of the various layers may be from 50 to 150 μm for the layer (1) and from 1 000 to 5 000 μm for the layer (2). The thicknesses are preferably, in μm, starting from the layer (1): 80/1 500. All the other elements described for the main invention apply.

As regards the second variant, the thicknesses of the various layers may be between 100 and 500 μm for the layer (2) and from 1 000 to 5 000 μm for the layer (3). The thicknesses are preferably, in μm, starting from the layer (2): 250/1500. All the other elements described for the main invention apply.

As regards the third variant, the thicknesses of the various layers may be from 100 to 500 μm for the layer (1) and from 1 000 to 5 000 μm for the layer (3). The thicknesses are preferably, in μm, starting with the layer (1): 250/1 500. The primer is advantageously prepared by dry-blending the one-component epoxy resin powder and the L2 powder. All the other elements described for the main invention apply.

EXAMPLES

Materials Used

Steel Tube:

Welded steel tube (shade E36-4) of length 3 meters, outside diameter 114.3 mm and thickness 6.3 mm, sold by Van Leeuwen Tubes (45120 Chalette sur Loing, France).

Chromatation:

Accomet PC chromatation system, sold by Brent Europe Ltd. (address: Ridgeway, Iver, Buckinghamshire, SLO 9JJ, UK).

Epoxy Primers of the Layer (1):

Eurokote® 798: Epoxy primer powder produced by BS Coating. Gel time 45±5 s at 180° C. Tg=120–140° C. (DSC on crosslinked film).

Scotchkote® 6258: Novolac epoxy primer powder produced by 3M®. Gel time 26 s at 182° C. Tg=166° C. (DMA on crosslinked film).

Materials Used for the Binders of the Layer (2):

Polymers L3:

Kynar® 3120–15: HFP/VF2 copolymer produced by Atofina, with a melt volume flow rate MVFR=4 $cm^3$/10 min at 230° C. under 5 kg, and a melting point of 165° C.

Kynar® 2850–04: HFP/VF2 copolymer produced by Atofina, with a melt volume flow rate MVFR=10 $cm^3$/10 min at 230° C. under 5 kg, and a melting point of 158° C.

Acrylic Polymer L1:

Oroglas® HT121: copolymer of methyl methacrylate and of acrylic acid, produced by Atofina, of Tg=130° C. and MVFR=1.8 $cm^3$/10 min at 230° C. under 3.8 kg.

Fluoropolymer L2:

MKB212: Product obtained according to the procedure described later, starting with a PVDF latex which is a precursor of Kynar® 1000HD, PVDF homopolymer of MVFR=1.1 $cm^3$/10 min at 230° C. under 5 kg and with a melting point of 169° C. The melting point of MKB212 is 168° C.

Fluoropolymer of the Layer (3):

Kynar® 740: vinylidene fluoride homopolymer produced by Atofina, with a melt volume flow rate MVFR=1.1 $cm^3$/10 min at 230° C. under 5 kg and a melting point of 168° C.

Preparation of MKB212:

A polyvinylidene fluoride latex Kynar 1000 HD, prepared according to the emulsion process as disclosed in patent U.S. Pat. No. 4,025,709, is used as fluoropolymer starting material. After drying at 105° C. for 24 hours, this latex gives a dry powder. This latex, referred to as Latex 1 hereinbelow, contains 40% by weight of PVDF. However, the process according to the present invention may be applied in particular to any PVDF latex or VF2 copolymer obtained by an emulsion process or to any suspension of PVDF or VF2 copolymer obtained by a suspension process.

Dehydrofluorination step: The preparation of 7.2 kg of an aqueous sodium chloride solution containing 15% by weight of NaOH in water is commenced in a stirred 20-liter reactor. This solution is brought to 70° C., followed by addition thereto of 7.2 kg of Latex 1 optionally diluted in deionized water so as to have a given solids content, at a rate of 0.72 kg/min with stirring at 180 rpm. A brown coagulated emulsion is thus obtained which becomes progressively darker the more the degradation proceeds. Depending on the dehydrofluorination reaction time, a fine black powder is obtained which becomes progressively insoluble in the usual organic solvents, in particular dimethylformamide (DMF) or N-methylpyrrolidone (NMP).

Step of reaction with an oxidizing agent: The reaction medium is acidified to pH=5, with continuous stirring and while maintained at a temperature of 70° C., by adding about 2.5 kg of 36% by weight hydrochloric acid. 1.68 kg of 35% by weight hydrogen peroxide are then added at a rate of 0.4 kg/min, after which the pH is increased to a value of between 6.6 and 7.6 by adding a sodium hydroxide solution containing 15% by weight of NaOH. The mixture is left to react while maintaining the pH between 6.6 and 7.6 by adding the same sodium hydroxide solution. A gradual decoloration of the coagulated emulsion is observed, which becomes pale yellow to ochre.

Finishing: The solid coagulate in suspension is filtered to give a pale yellow powder which is washed with three dispersions in 20 liters of water with stirring and successive filtrations. A powder is thus obtained which is dried in an oven at 105° C. to constant weight.

Characterization: The characterization of this powder is carried out by measuring the absorbance at 300 nm which is obtained by analysis with a Perkin-Elmer LC-75 spectrophotometer using a concentration of 0.1% by weight of product in NMP. The dissolution time is 24 hours before carrying out the measurement.

Structures with Binder Comprising the Acrylic Polymer L1

Example 1

Kynar 3120–15 and Oroglas HT121 are mixed together in a Fairex Super 2/50 single-screw extruder in a proportion of 85/15 by mass. The mixture is granulated at the extruder outlet.

The steel tube to be coated (114 mm outside diameter) is degreased and then shot-blasted. Immediately after this operation, the tube mounted on a gantry support rotating at 10 rpm and advancing at 50 cm/min is heated to 200° C. with an induction oven and coated with the primer powder Eurokote 798 sprayed via a spray gun. The laterally extruded binder is wound around the tube on the primer 10–20 s after depositing this primer. The Kynar 740 also extruded laterally, coats the first two layers immediately after. A roll press ensures good contact between the various layers. The coated tube is cooled with water for 3 minutes.

The flow rates of the spray gun and of the two extruders are adjusted so as to have 70–100 μm of primer, 250–350 μm of binder and 1 250–1 500 μm of Kynar 740.

In summary, the structure of the coating obtained is as follows:

Eurokote 798/binder {85% Kynar 3120–15, 15% Oroglas HT121}/Kynar 740 80 μm/300 μm/1 400 μm For the assessment, the tube is cut into rings which are then assessed by peeling according to standard prEN 10 285:1 998. For each temperature test (110, 130 and 150° C.), three rings are peeled. The mean force and the standard deviation are calculated on the three values obtained. The peeling results and the breaking modes are given in Table I.

Example 4

The structure below is prepared in the same way as in Example 3, but with a thicker outer layer:

Accomet PC/Eurokote 798/binder {85% Kynar 3120–15, 15% Oroglas HT121}/Kynar 740
80 μm/300 μm/2 000 μm Example 5

The structure below is prepared in the same way as in Example 3:

Accomet PC/Scotchkote 6258/binder {85% Kynar 2850–04, 15% Oroglas HT121}/Kynar 740
80 μm/300 μm/1 400 μm Example 6

The structure below is prepared in the same way as in Example 1:

Eurokote 798/binder {85% Kynar 2850–04, 15% Oroglas HT121}/Kynar 740
80 μm/300 μm/1 400 μm

TABLE I

Results of peeling in N/cm and breaking mode at 110, 130 and 150° C.

| Structure | Example 1 | Example 2 | Example 3 | Example 4 | Example 5 | Example 6 |
|---|---|---|---|---|---|---|
| 110° C. Mean | 147 | 134 | 141 | 158 | 167 | 164 |
| Standard deviation | ±9 | ±8 | ±5 | ±10 | ±4 | ±10 |
| Mode | CP | CP | C | C | CP + F | CP + F |
| 130° C. Mean | 108 | 114 | 117 | 106 | 125 | — |
| Standard deviation | ±9 | ±10 | ±10 | ±14 | ±1 | — |
| Mode | CP | CE | C | C | CP + F | — |
| 150° C. Mean | 40 | 7 | 56 | 42 | 40 | 10 |
| Standard deviation | ±10 | | ±16 | ±21 | ±1 | ±3 |
| Mode | CP/AO | AO | C | C | C | AO |

Breaking modes: C = cohesive break in the binder, CE = cohesive break in the binder in the outer layer interface region, CP = cohesive break in the binder in the epoxy primer layer interface region, AO = primer adhesive-metal break, +F = with creep of the peeling arm Example 2

The structure below is prepared in the same way as in Example 1:

Eurokote 798/binder {70% Kynar 3120–15, 30% Oroglas HT121}/Kynar 740 80 μm/300 μm/1 400 μm Example 3

The structure below is prepared in the same way as in Example 1, but on a chromated tube:

Accomet PC/Eurokote 798/binder {85% Kynar 3120–15, 15% Oroglas HT121}/Kynar 740
80 μm/300 μm/1 400 μm The Accomet PC chromating solution is applied by brush to the tube after shot-blasting. The treatment in the induction oven at 200° C. suffices to ensure good drying before applying the primer.

Structures with Binder Comprising the Fluoropolymer L2:

Example 8

The structure below is prepared in the same way as in Example 1:

Eurokote 798/binder {85% Kynar 3120–15, 15% MKB212}/Kynar 740
80 μm/300 μm/1 400 μm The results are given in Table II.

Example 9

The structure below is prepared in the same way as in Example 1:

Eurokote 798/binder {70% Kynar 3120–15, 30% MKB212}/Kynar 740
80 μm/300 μm/1 400 μm Example 10

The structure below is prepared in the same way as in Example 1:

Scotchkote 6258/binder {85% Kynar 3120–15, 15% MKB212}/Kynar 740
80 $\mu$m/300 $\mu$m/1 400 $\mu$m

TABLE II

Results of peeling in N/cm and breaking mode at 110, 130 and 150° C.

| Structure | Example 8 | Example 9 | Example 10 |
|---|---|---|---|
| 110° C. Mean | 169 | 187 | 162 |
| Standard deviation | ±4 | ±2 | ±1 |
| Mode | CE + F | CE + F | C |
| 130° C. Mean | 134 | 142 | 128 |
| Standard deviation | ±4 | ±5 | ±2 |
| Mode | CE + F | CE + F | CE + F |
| 150° C. Mean | 10 | 11 | 90 |
| Standard deviation | ±1 | | ±5 |
| Mode | AO | AO | CE + F |

Breaking modes: C = cohesive break in the binder, CE = cohesive break in the binder in the outer layer interface region, CP = cohesive break in the binder in the epoxy primer layer interface region, AO = primer adhesive-metal break, +F = with creep of the peeling arm

What is claimed is:

1. A coated metal surface comprising, successively:

a layer (1) of epoxy primer placed next to the metal, a layer (2) of binder comprising a blend comprising 98 to 50 parts by weight of at least one fluoropolymer L3 and 2 to 50 parts of at least one polymer chosen from polymers L2 which are fluoropolymers chemically modified by a partial dehydrofluorination followed by an oxidation, a layer (3) of fluoropolymer.

2. Coated A coated metal surface comprising, successively:

a layer (1) of epoxy primer placed next to the metal, a layer (2) of binder comprising a blend comprising 98 to 50 parts by weight of at least one fluoropolymer L3 and 2 to 50 parts of at least one polymer chosen polymers L2 which are fluoropolymers chemically modified by a partial dehydrofluorination followed by an oxidation.

3. A coated metal surface which is the outer surface of tubes, comprising, successively:

a layer (2) of binder placed next to the metal and comprising 98 to 50 parts by weight of at least one fluoropolymer L3 per 2 to 50 parts, respectively, of a mixture comprising at least one polymer chosen from the polymers L2 which are fluoropolymers chemically modified by a partial dehydrofluorination followed by an oxidation, and optionally at least one polymer chosen from acrylic polymers L1, a layer (3) of fluoropolymer.

4. A coated metal surface comprising, successively:

a layer (1) of primer placed next to the metal and comprising 1 to 70 parts of a polymer chosen from polymers L2 which are fluoropolymers chemically modified by a partial dehydrofluorination followed by an oxidation, per 30 to 99 parts, respectively, of an epoxy primer, a layer (3) of fluoropolymer.

5. A coated metal surface according to claim 1, in which the epoxy primer is the product of the reaction of a thermosetting epoxy resin and of a hardener.

6. Coated metal surface according to claim 5, in which the gel time defined by Afnor standard NFA 49-706 is between 20 and 60 seconds.

7. A coated metal surface according to claim 5, in which the epoxy primer has a Tg greater than 120° C.

8. A coated metal surface according to claim 1, containing an acrylic polymer L1 which is a copolymer of methyl methacrylate and of acrylic acid.

9. A coated metal surface according to claim 1, containing an acrylic polymer L1 having a Tg greater than or equal to 120° C.

10. A coated metal surface according to claim 1, wherein the chemically modified fluoropolymers are chemically modified to obtain a fluoroplastic of or a fluoroelastomer which contains units of general formula (I):

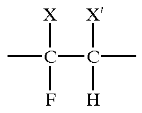

(I)

in which X and X' may be, independently of each other, a hydrogen atom, or a halogen, or a perhaloalkyl.

11. Coated metal surface according to claim 10, in which the oxidation to prepare L2 is obtained in heterogeneous aqueous medium with hydrogen peroxide ($H_2O_2$) or with the hypochlorite anion (ClO).

12. A coated metal surface according to claim 1, in which the fluoropolymer L3 is polyvinylidene fluoride (PVDF) homopolymer or a vinylidene fluoride-hexafluoropronviene (VF2-HFP) copolymer.

13. A coated metal surface according to claim 1, in which the melting point of L3 is greater than 150° C.

14. A coated metal surface according to claim 3, in which the fluoropolymer of the layer (3) is polyvinylidene fluoride (PVDF) homopolymer or a vinylidene fluoride-hexafluoropropylene (VF2-HFP) copolymer having a melting point of at least 165° C.

15. A coated metal surface according to claim 1, in which the surface is an outer surface of a tube.

16. A coated metal surface according to claim 10, wherein said at least one X and X' is chlorine, fluorine or perfluoroalkyl.

17. A coated metal surface according to claim 1, wherein the metal is steel.

18. A coated metal surface according to claim 15, wherein the metal is steel.

19. In a method of transporting oil through a tube, the improvement wherein the tube is comprises a coated metal surface in accordance with claim 18.

20. A method according to claim 19, wherein the tube is in sea water and the oil is hot oil.

21. A coated metal surface according to claim 2, in which the fluoropolymer L3 is polyvinylidene fluoride (PVDF) homopolymer or a vinylidene fluoride-hexafluoropropylene (VF2-HFP) copolymer.

22. A coated metal surface according to claim 4, in which the fluoropolymer L3 is polyvinylidene fluoride (PVDF) homopolymer or a vinylidene fluoride-hexafluoropropylene (VF2-HFP) copolymer.

23. A coated metal surface according to claim 10, in which the fluoropolymer L3 is polyvinylidene fluoride (PVDF) homopolymer or a vinylidene fluoride-hexafluoropropylene (VF2-HFP) copolymer.

* * * * *